US011332354B2

(12) United States Patent
Christensen et al.

(10) Patent No.: US 11,332,354 B2
(45) Date of Patent: *May 17, 2022

(54) TEST TUBE CAPPING AND DE-CAPPING APPARATUS

(71) Applicant: Brooks Automation, Inc., Chelmsford, MA (US)

(72) Inventors: Stig Christensen, Greve (DK); Lars Hovendahl, Hvalso (DK); Michael Gabs Kaagaard Nielsen, Lejre (DK)

(73) Assignee: Brooks Automation, Inc., Chelmsford, MA (US)

( * ) Notice: Subject to any disclaimer, the term of this patent is extended or adjusted under 35 U.S.C. 154(b) by 471 days.

This patent is subject to a terminal disclaimer.

(21) Appl. No.: 16/286,118

(22) Filed: Feb. 26, 2019

(65) Prior Publication Data

US 2019/0359463 A1    Nov. 28, 2019

Related U.S. Application Data

(63) Continuation of application No. 14/419,854, filed as application No. PCT/EP2013/066365 on Aug. 5, 2013, now Pat. No. 10,214,404.

(30) Foreign Application Priority Data

Aug. 7, 2012  (DK) .......................... PA2012 00492

(51) Int. Cl.
*B67B 3/20* (2006.01)
*B67B 3/26* (2006.01)
(Continued)

(52) U.S. Cl.
CPC .............. *B67B 3/2066* (2013.01); *B67B 3/20* (2013.01); *B67B 3/2073* (2013.01); *B67B 3/268* (2013.01);
(Continued)

(58) Field of Classification Search
CPC ....... B67B 3/2066; B67B 3/2073; B67B 3/20; B67B 7/182; B67B 1/06; B67B 7/18;
(Continued)

(56) References Cited

U.S. PATENT DOCUMENTS 2,496,877 A * 2/1950 Frankw ...................... B65B 7/28
53/405
2,559,358 A * 7/1951 Hullhorst .............. B67B 3/2053
53/331.5
(Continued)

FOREIGN PATENT DOCUMENTS

EP    1424307    6/2004
EP    1659091    5/2006
(Continued)

OTHER PUBLICATIONS

International Search Report, PCT/EP2013/066365, dated Feb. 21, 2014, "Test Tube Capping and De-Capping Apparatus".
(Continued)

*Primary Examiner* — Hemant Desai
*Assistant Examiner* — Mobeen Ahmed
(74) *Attorney, Agent, or Firm* — Hamilton, Brook, Smith & Reynolds, P.C.

(57) ABSTRACT

An apparatus (100) for automated capping and de-capping of test tubes (112) having an ejector pin (230) system for individualized cap (113) ejection.

10 Claims, 5 Drawing Sheets

(51) Int. Cl.
*B67B 7/18* (2006.01)
*G01N 35/04* (2006.01)
*B65B 7/28* (2006.01)
*B67B 1/06* (2006.01)

(52) U.S. Cl.
CPC ............. *B67B 7/182* (2013.01); *G01N 35/04* (2013.01); *B65B 7/2828* (2013.01); *B65B 7/2835* (2013.01); *B67B 1/06* (2013.01); *B67B 7/18* (2013.01); *G01N 2035/0405* (2013.01); *G01N 2035/0418* (2013.01)

(58) Field of Classification Search
CPC ............... B67B 2007/18; G01N 35/04; G01N 2035/0418; G01N 2035/0405; B65B 7/2828; B65B 7/2835
USPC ........... 53/299, 317, 331.5, 490, 318.4, 492
See application file for complete search history.

(56) References Cited

U.S. PATENT DOCUMENTS

| | | | | | |
|---|---|---|---|---|---|
| 3,589,103 | A | * | 6/1971 | Calvillo | B67B 3/2053 53/381.4 |
| 3,683,598 | A | * | 8/1972 | Van Zijp | B67B 3/2073 53/331.5 |
| 3,775,829 | A | * | 12/1973 | Rice | B67B 7/182 29/426.3 |
| 3,803,795 | A | * | 4/1974 | Ouellette | B67B 7/182 53/492 |
| 3,852,941 | A | * | 12/1974 | Brass | B65B 7/2835 53/317 |
| 4,265,071 | A | * | 5/1981 | Smith | B67B 7/182 53/331.5 |
| 4,357,787 | A | * | 11/1982 | Long | B67B 3/2073 53/272 |
| 4,519,276 | A | * | 5/1985 | Grabarski | B67B 7/182 81/3.09 |
| 4,616,466 | A | * | 10/1986 | Tanaka | B67B 3/208 53/75 |
| 4,906,147 | A | * | 3/1990 | Friesinger | B23B 31/113 279/97 |
| 4,934,040 | A | * | 6/1990 | Turchan | B23G 1/32 29/566 |
| 5,301,488 | A | * | 4/1994 | Ruhl | B67C 7/00 53/282 |
| 5,321,935 | A | * | 6/1994 | Spatz | B67B 3/26 53/490 |
| 5,327,697 | A | * | 7/1994 | Kent | B67B 3/2073 53/331.5 |
| 5,687,552 | A | * | 11/1997 | Barca | B67B 3/206 53/306 |
| 5,718,097 | A | * | 2/1998 | Kinoshita | G01N 1/286 53/201 |
| 5,884,450 | A | * | 3/1999 | Ronchi | B67B 3/00 53/317 |
| 6,158,196 | A | * | 12/2000 | Trebbi | B67B 3/2033 53/317 |
| 6,170,232 | B1 | * | 1/2001 | VandeGeijn | B23B 31/113 279/4.09 |
| 6,216,340 | B1 | * | 4/2001 | Fassbind | B67B 7/182 29/773 |
| 6,240,678 | B1 | * | 6/2001 | Spether | B67B 3/2073 53/317 |
| 6,508,046 | B1 | * | 1/2003 | Resterhouse | B67B 3/2066 53/331.5 |
| 7,024,837 | B2 | * | 4/2006 | Takebe | B67B 3/20 53/317 |
| 7,647,746 | B2 | * | 1/2010 | Ueda | B67B 3/2033 53/331.5 |
| 7,661,245 | B2 | | 2/2010 | Brown | |
| 7,874,127 | B2 | * | 1/2011 | Brown | B67B 3/2066 53/317 |
| 8,166,730 | B2 | * | 5/2012 | Schmatz | B67B 3/2066 53/331.5 |
| 8,915,047 | B2 | * | 12/2014 | Wilhelm | B67B 3/12 53/300 |
| 9,381,524 | B2 | * | 7/2016 | Bailey | B04B 11/043 |
| 10,214,404 | B2 | | 2/2019 | Christensen et al. | |
| 2001/0026135 | A1 | * | 10/2001 | Zalkin | H02P 6/04 318/432 |
| 2002/0184853 | A1 | * | 12/2002 | Arrant | B65B 7/2835 53/343 |
| 2003/0175156 | A1 | * | 9/2003 | Ford | G01N 35/04 422/63 |
| 2004/0065049 | A1 | * | 4/2004 | Cirio | B67B 3/2086 53/317 |
| 2004/0139811 | A1 | * | 7/2004 | Cirio | B67B 3/2033 73/865.9 |
| 2005/0144908 | A1 | * | 7/2005 | Yang | B65B 7/2835 53/331.5 |
| 2005/0183388 | A1 | * | 8/2005 | Cirio | B67B 3/2066 53/287 |
| 2006/0130597 | A1 | * | 6/2006 | Bernard | G01N 35/026 73/864.21 |
| 2008/0022808 | A1 | * | 1/2008 | Owen | G01N 35/026 81/3.2 |
| 2008/0127611 | A1 | * | 6/2008 | Brown | B67B 3/2066 53/317 |
| 2009/0293437 | A1 | * | 12/2009 | Schulz | B67B 3/2033 53/490 |
| 2011/0083405 | A1 | * | 4/2011 | Dewert | B67B 3/2033 53/490 |
| 2011/0289889 | A1 | * | 12/2011 | Kohanski | B67B 3/2006 53/485 |
| 2013/0239522 | A1 | * | 9/2013 | Melrose | B65D 1/0261 53/467 |
| 2014/0174028 | A1 | * | 6/2014 | Yamagata | B65B 7/28 53/287 |
| 2015/0175398 | A1 | | 6/2015 | Christensen | |
| 2015/0273468 | A1 | * | 10/2015 | Croquette | B01L 3/50825 422/63 |
| 2017/0307642 | A1 | * | 10/2017 | Yu | B67B 3/22 |
| 2017/0350878 | A1 | * | 12/2017 | Holmes | G01N 21/07 |

FOREIGN PATENT DOCUMENTS

| | | |
|---|---|---|
| EP | 1882949 | 1/2008 |
| EP | 2385015 | 11/2011 |
| JP | 2010 100312 | 5/2010 |
| WO | WO 03/034038 | 4/2003 |

OTHER PUBLICATIONS

Written Opinion of the International Searching Authority, PCT/EP2013/066365, dated Feb. 21, 2014, "Test Tube Capping and De-Capping Apparatus".

Danish Search Report 15067985, dated Mar. 12, 2013.

* cited by examiner

TEST TUBE CAPPING AND DE-CAPPING APPARATUS

RELATED APPLICATIONS

This application is a continuation of U.S. application Ser. No. 14/419,854, filed Aug. 5, 2013, which is the U.S. National Stage of International Application No. PCT/EP2013/066365, filed on Aug. 5, 2013, published in English, which claims priority under 35 U.S.C. § 119 or 365 to Denmark Application No. PA 2012 00492, filed Aug. 7, 2012. The entire teachings of the above applications are incorporated herein by reference.

BACKGROUND

High value biological samples are often stored and processed using so-called SBS format racks containing a plurality of test tubes. Such racks may contain, for example, 96 test tubes in an array of 8 by 12 apertures designed to hold the tubes securely. The test tubes and their contents may be maneuvered in a processing system, for example between a cold store and various processing stations and may be required to be filled (partly or fully) or processed simultaneously or individually.

Conventionally, capping and de-capping has either been carried out by hand or else by means of a capping and de-capping unit one test tube at a time, either while they are still held in the rack or after they have been separated from the rack. This is not only tedious (particularly in the case of manual capping and de-capping), but also slow as it is usual for multiple tubes to require processing in the same way at the same time.

It is known to provide a linear array of capping and de-capping units to allow for the capping and de-capping of a row of tubes, but such systems have been bulky as a result of the dimensions of the drive mechanisms for the capping and de-capping units, the close spacing of the test tubes requiring the drive mechanisms of the capping and de-capping units to be remote from the capping and de-capping heads and disposed over a larger footprint than the rack because of their size.

EP 1882949 disclose a capping and de-capping apparatus having a test tube rack support for supporting a rack containing a plurality of capped test tubes in a given position. A head unit supports a two-dimensional array of capping and de-capping spindles, each of which includes a clutch and a capping and de-capping spigot or socket, the spindles being aligned with the test tube positions defined in the rack. A drive mechanism moves the tubes and the head unit relatively towards and away from one another in use, when a rack containing capped test tubes is disposed in the rack support, causing engagement and disengagement of the spigots or sockets with and from the tube caps. A spindle drive system provides simultaneous rotation of the spigots or sockets together after engagement with the caps, either to attach caps to the tubes or detach caps from the tubes. Ejection of the caps from the spigots is caused by moving an external net in the opposite direction to the spindle translational movement thereby detaching all sockets from all caps in one movement.

SUMMARY

On this background the present applicants realized the need for a simple and customizable apparatus for capping and de-capping one or more test tubes held within the tight confinement of standard laboratory test tube racks; which will permit each tube to be individually capped and de-capped for some laboratory uses while retaining the ability to cap or de-cap all tubes within the rack at the same time for other uses.

This object is achieved by providing a apparatus for capping and de-capping test tubes having one or more capping and de-capping grippers equipped with a capping and de-capping socket unit wherein said one or more grippers each are configured with an ejector pin moveably arranged within said one or more grippers and wherein said ejector pin may perform a translational movement relative to the said one or more grippers effecting the release from the socket unit of a cap retained by the socket unit.

This object is further achieved by providing a capping and de-capping gripper equipped with a capping and de-capping socket unit said gripper and socket unit so arranged as to permit said ejector pin to perform a translational movement relative to the said gripper and socket unit effecting the release from the socket unit of a cap retained by the socket unit.

This object is further achieved by providing said ejector pin with an actuator unit capable of rotating said ejector pin.

This object is further achieved by providing said capping and de-capping socket unit with a socket for grabbing and retaining a test tube cap adaptable to a plurality of different laboratory test tube systems.

This object is further achieved by combining the above apparatus with a programmable logic controller, microprocessor, or computer application, either internal or external to said apparatus, for controlling the movement of the gripper units and ejector pins individually, in subgroups of the total array of gripper units and ejector pins, or the totality of the gripper units and ejector pins and by providing a user interface permitting the user to select which gripper or grippers within the array of grippers that shall engage a corresponding tube within the rack.

Further objects, features, advantages, and properties of the apparatus and method according to the present disclosure will become apparent from the detailed description.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

In FIG. 1a the combination of the apparatus according to the present invention with an external control unit is exemplarily shown without this embodiment being thereby considered preferred.

DETAILED DESCRIPTION

A description of example embodiments follows.

In the following detailed description the capping and de-capping apparatus, the capping and de-capping gripper, the capping and de-capping socket unit and the application for controlling the capping and de-capping grippers individually are described in detail with reference to the exemplary embodiments.

Figure 1A:
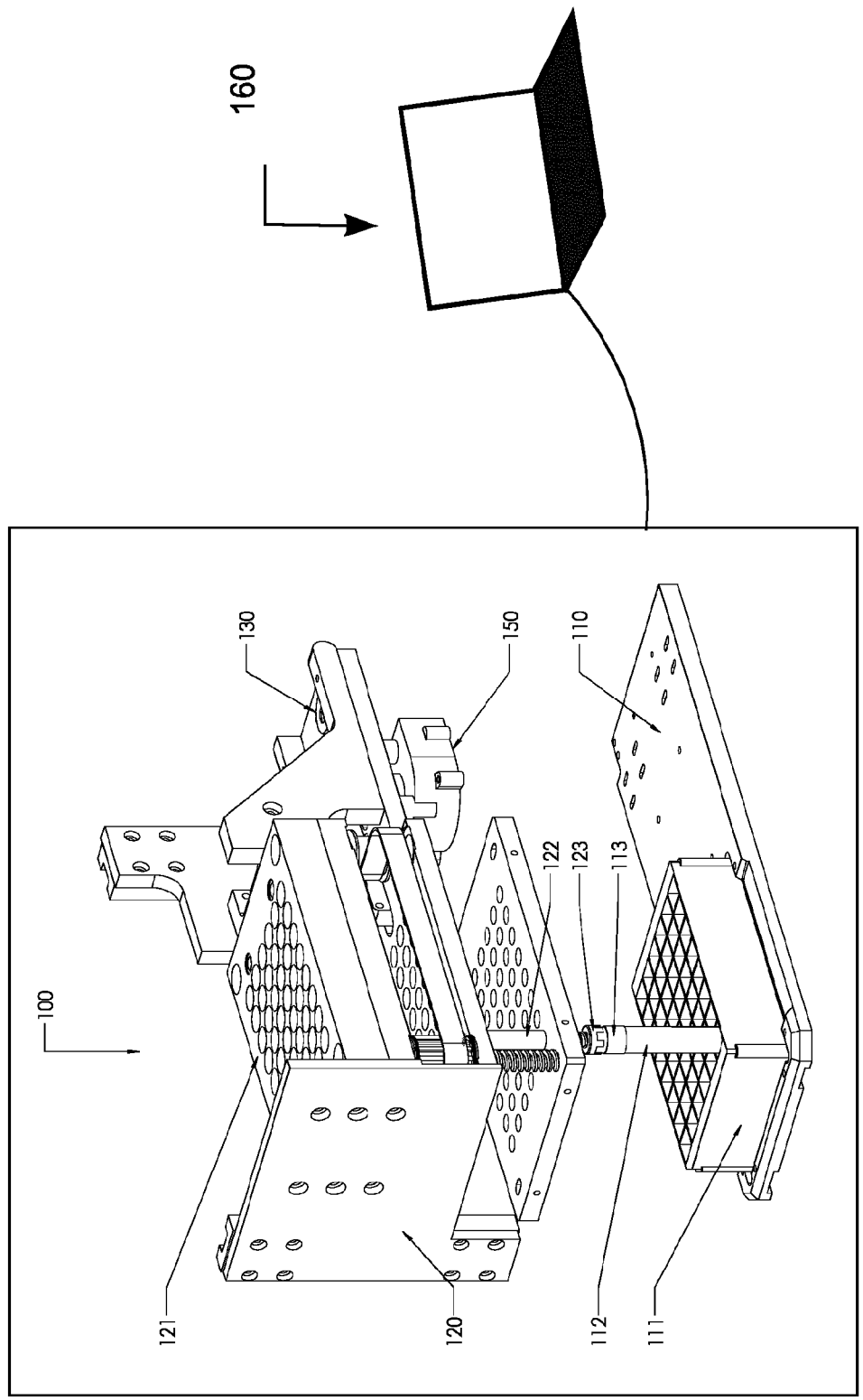
FIGS. 1a and 1b present two different views of the capping and de-capping apparatus according to the teachings herein.
Figure 1B:
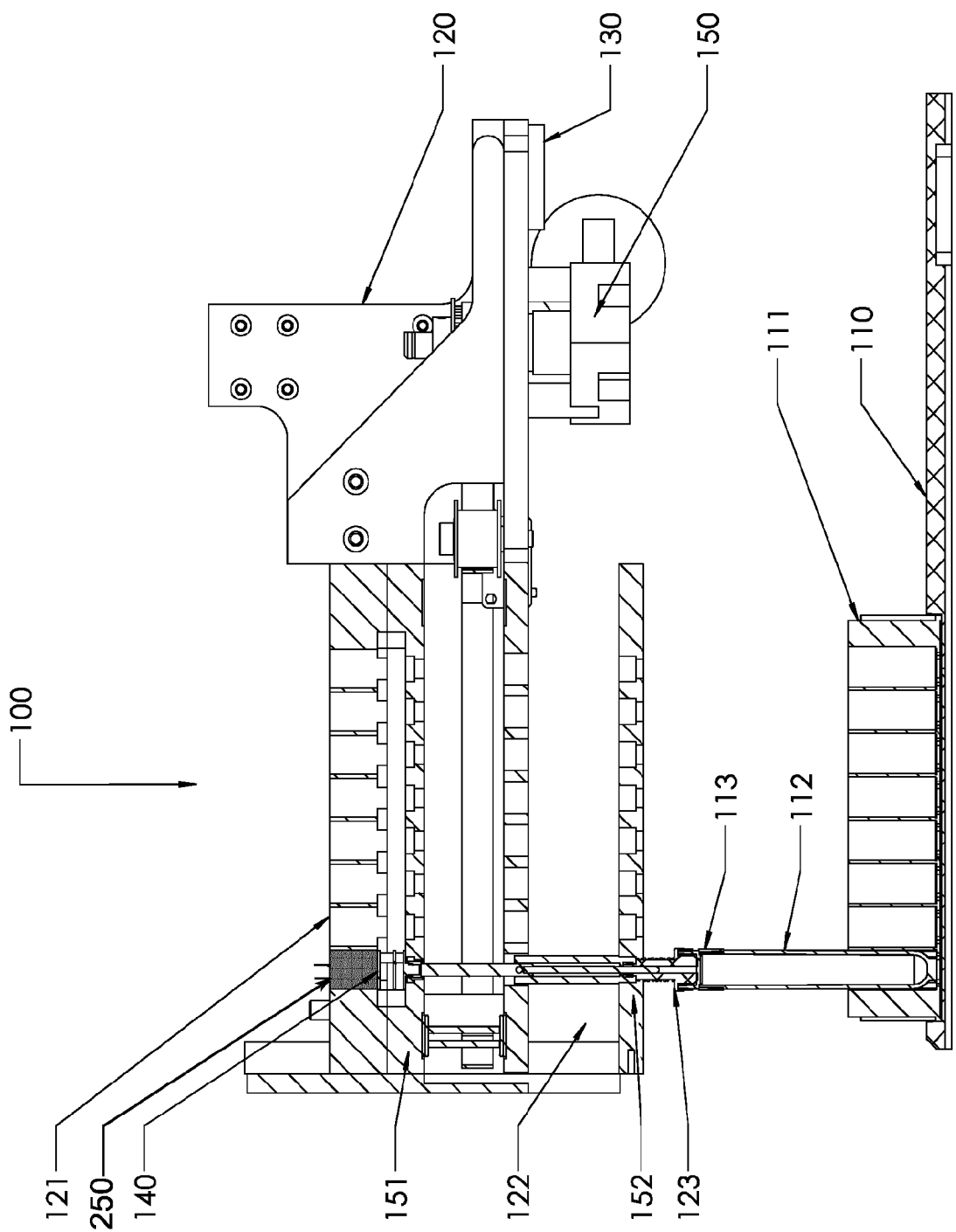

An embodiment of the capping and de-capping apparatus 100 according to the invention is depicted in detail in FIGS. 1a and 1b. In FIG. 1a an external control unit 160 is shown for illustrative purposes. As is clear to the skilled person, the control unit 160 can be external to the apparatus 100 for some purposes or can be integrated into the apparatus for other purposes. Further the connection between the control unit 160 and the apparatus 100 may be a cable as shown in the figure or could be a WIFI-signal or other like options depending on the skilled person's choice, such choices being considered trivial in a modern laboratory setting. [0020] The capping and de-capping apparatus 100 is equipped with a rack support 110 for supporting a tube rack 111, preferably a test tube rack, for containing in at least one given position within the rack 111 at least one tube 112, preferably a test tube, fitted to receive and/or dispose of a cap 113, preferably a screw cap.

The capping and de-capping apparatus 100 is further equipped with a head unit 120 supporting a two-dimensional array 121 (in the present exemplary embodiment a 6*8 array) of capping and de-capping grippers 122, each capping and de-capping gripper 122 including a capping and de-capping socket unit 123 capable of engaging and retaining a cap, the capping and de-capping grippers 122 being aligned with the tube positions within the rack 111.

The capping and de-capping apparatus 100 is also equipped with a drive system 130 for moving the rack support 110 and head unit 120 relatively towards and away from one another in use, when a rack 111 containing at least one tube 112 is disposed in the rack support 110, to cause engagement and disengagement of at least one capping and de-capping socket unit 123 with and from the at least one tube 112.

The capping and de-capping apparatus 100 is further equipped with a drive system 140 for rotating at least one capping and de-capping gripper 122 and the capping and de-capping socket unit 123 attached thereto, said rotation of the capping and de-capping socket unit 123, after engagement of the at least one capping and de-capping socket unit 123 with at least one cap 113, can cause either attachment of the at least one cap 113 to the at least one tube 112 within the rack 111 when the at least one capping and de-capping gripper 122 rotate in the one direction or detachment of the at least one cap 113 from the at least one tube 112 when the at least one capping and de-capping gripper 122 rotate in the other direction.

Further, the capping and de-capping apparatus 100 is further equipped with a drive system 150 internal to the head unit 120, permitting a first attachment body 151 and a second attachment body 152 to perform a movement towards and away from each other independently of the movement of the head unit 120 when moved by the drive system 150.

Finally, the capping and de-capping apparatus 100 is further equipped with a control unit 160, said control unit being preferably a programmable logic controller, a microprocessor, or a computer application, said control unit 160 being either internal or external to said apparatus 100, for controlling the movement, both translational and rotational, of the gripper units and ejector pins individually, in subgroups of the total array of gripper units and ejector pins, or the totality of the gripper units and ejector pins and by providing a user interface permitting the user to select which gripper or grippers within the array of grippers that shall engage a corresponding tube within the rack. In a preferred embodiment the control unit 160 is equipped with means for measuring the torque associated with each rotating gripper, preferably by measuring the current supplied to the drive system 140 needed to effectuate a continued rotation of at least one gripper, and means for terminating the rotation of the at least one gripper if a given threshold value is exceeded.

Figure 2:
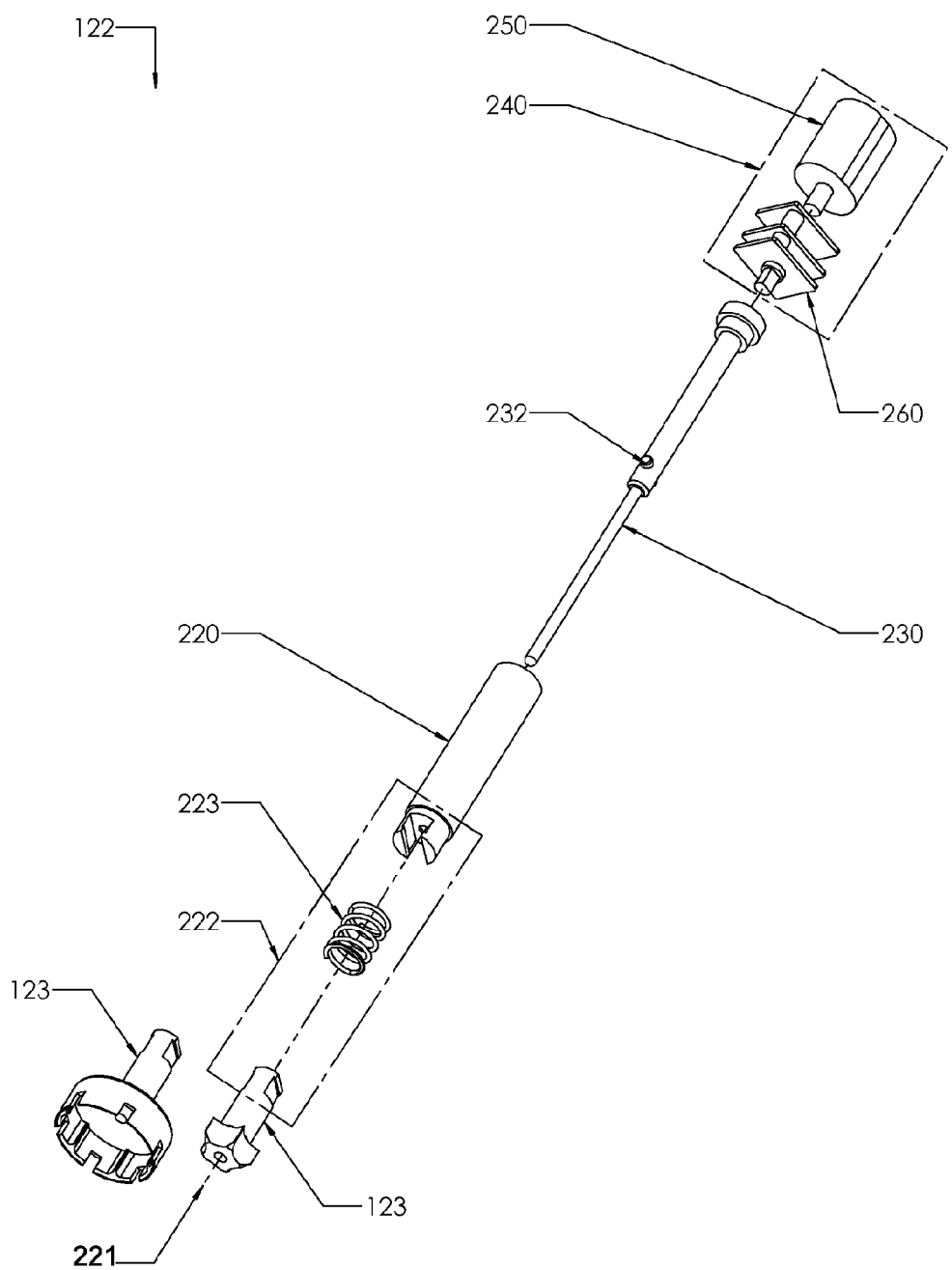
FIG. 2 is a view of a capping and de-capping gripper according to the teachings herein.

An embodiment of the capping and de-capping gripper 122 according to the invention is depicted in detail in FIG. 2.

The capping and de-capping gripper 122 comprises a capping and de-capping socket unit 123 capable of engaging and retaining a cap, said capping and de-capping socket unit 123 having a through going passage 211, an ejector pin guide 220 also having a through going passage 221, and an ejector pin 230, and wherein the socket unit 123 and the ejector pin guide 220 are so arranged to permit said ejector pin 230 to perform a translational movement within said socket unit 123 and said ejector pin guide 220.

The ejector pin 230 is stationary with respect to the above mentioned first attachment body 151, for example because it is attached to said first attachment body 151. Likewise the ejector pin guide 220 is stationary with respect to said second attachment body 152, for example because it is attached to said second attachment body 152. Accordingly, upon the activation of the drive system 150, said translational movement of said ejector pin 230 within said socket unit 123 and said ejector pin guide 220 can be effectuated.

While it is possible for said capping and de-capping socket unit 123 and said ejector pin guide to be manufactured in one piece, it is preferred that they are not. Therefore in a preferred embodiment the capping and de-capping socket unit 123 is attachable and detachable to said ejector pin guide 220 such that when said capping and de-capping socket unit 123 is attached to said ejector pin guide 220, said ejector pin 230 may perform a translational movement within the said ejector pin guide 220 attached to the said capping and de-capping socket unit 123.

The drive system 140 for rotating the ejector pin 230 comprises a plurality of actuator units 240 coupled to said ejector pin 230, each actuator unit 240 comprising an actuator 250, preferably an electro motor, mechanically coupled to said ejector pin 230. In a preferred embodiment of the actuator unit 240, said actuator 250 is mechanically coupled to said ejector pin 230 by means of a gear 260. Additionally the drive system 140 may comprise internal or external means for sensing the torque on said ejector pin 230, e.g. if the actuator 250 is an electro motor, by detecting a change in the current supplied to the actuator 250, and internal or external means for halting the actuator movement if a certain threshold torque is exceeded. Preferably, however, the means for sensing torque and the means for halting the actuator movement are associated with the control unit 160.

In this further embodiment wherein said ejector pin 230 is rotated by said actuator unit 240, preferably in the configuration of an actuator 250 coupled to a gear 260, said ejector pin 230 includes means for transferring the rotational movement created by said actuator unit 240 to said ejector pin guide 220 or said capping and de-capping socket unit 123. In one embodiment said means for transferring the rotational movement of said ejector pin 230 to said ejector pin guide 220 consists in a pin 232 protruding from said ejector pin 230 at a right angle and into a longitudinal groove in the ejector pin guide 220.

In a further embodiment the ejector pin guide 220 further comprises means 222 for attaching a capping and de-capping socket unit 123 to said ejector pin guide 220. In a preferred embodiment the means 222 for attaching a capping and de-capping socket unit 123 further comprises a biasing means 223, preferably a coil spring.

Figure 3A:
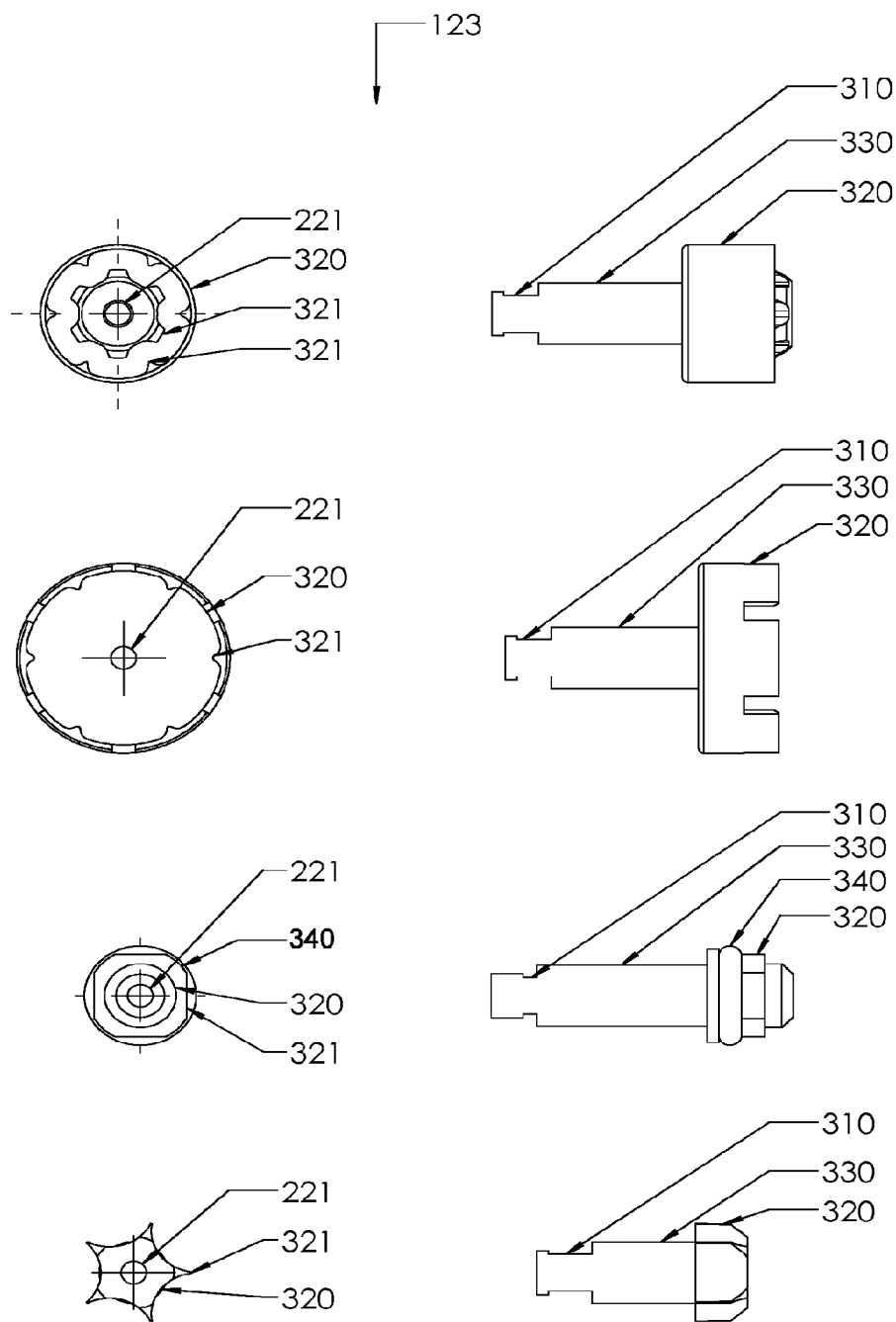
FIG. 3a is an exemplary view of four of the capping and de-capping socket units according to the teachings herein.
Figure 3B:
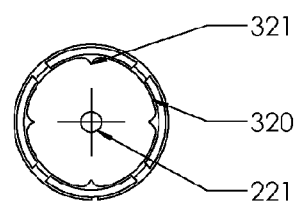
FIG. 3b is an exemplary view of a capping and de-capping socket unit combined with an external spring encircling the capping and de-capping socket.
Figure 3B:
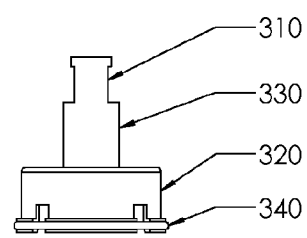

An embodiment of the capping and de-capping socket unit 123 according to the invention is depicted in detail in FIG. 3.

A capping and de-capping socket unit 123 capable of engaging and retaining a cap 113, preferably a test tube cap, for use with a capping and de-capping gripper 122 having a gripper connector 310 for attaching and detaching to said capping and de-capping gripper 122, or in the most preferred embodiment, to said ejection pin guide 220, is described in FIG. 3. The less preferred embodiment of a capping and de-capping socket unit permanently attached to said ejection pin guide is not shown in the figure. It is however to be understood, and such is also clear from the contents of FIG. 3, that the socket unit 123 is so conceived that the manner of which it engages and disengages a cap is independent of how it attaches to the ejector pin guide 220, and whether this attachment is permanent or not.

Both in the embodiment of a socket unit 213 permanently attached to said ejector pin guide 220 or in the preferred embodiment of a socket unit 123 which is attachable and detachable to said ejector pin guide 220, said socket unit 123 comprises a socket 320 for connecting to a cap, preferably a test tube cap, and even more preferably a screw cap for a test tube. In the preferred embodiment of an attachable or detachable socket unit 123, the socket unit 123 may further comprise a mechanical connection 330 between said gripper connector 310 and said socket 320, said gripper connector 310, said socket 320 and said optional mechanical connection 330 each having a through going passage 221.

The socket unit 123 and ejector pin guide 220 are preferably manufactured from a plastics material, preferably in a molding process such as injection molding. When the socket unit is permanently attached to said ejector pin guide 220, also this assembly may be manufactured from a plastics material, preferably in a molding process such as injection molding. When the socket unit 123 is not permanently attached to said ejector pin guide 220, said ejector pin guide 220 may also be manufactured from a material different from plastics, including metals such as but not limited to, aluminum or stainless steel, and using other means for manufacturing of said ejector pin guide 220 than injection molding.

Known plastics materials which are useful in the manufacture of the socket unit 123 and ejector pin guide 220 can be PEEK (Polyetheretherketone) or POM (Polyoximethylene) but also other plastics materials will be known to the skilled person.

The socket 320 is described in further detail in FIGS. 3a and b. A variety of test tube caps are known in the art and it is a further aim of the present invention to enable the attachment of the socket unit 123 in a simple manner to the test tube caps by applying a simple and adaptable method of attachment.

To this purpose each socket 320 is equipped with at least one friction pin 321, but preferably with a plurality of friction pins 321. A socket 320 according to the invention further has a through going passage 221, to permit the passage of the said ejector pin 230 through the said socket 320.

A socket 320 according to the present invention is so manufactured that upon engagement with a test tube cap 113, the socket 320 is squeezed over the test tube cap 113 and/or, where the test tube cap 113 contains a grove for inserting a socket into said grove, the socket 320 may further be inserted into said grove. Independently of the method of attachment for use with a specific test tube cap, the at least one friction pin 321 ensures a tight contact between the socket 320 and the test tube cap 113 such that when the capping and de-capping gripper 122 is undergoing a movement, either a translation or a translation combined with a rotation, the cap 113 is retained within the socket 320 until ejected using the ejector pin 230.

In one embodiment of the socket 320, for use with a test tube cap 113 that does not have a grove into which a socket can be inserted, the socket 320 has an inner geometrical shape that matches the outer geometrical shape of the test tube cap 113, that it is about to engage with the at least one, but preferably a plurality of friction pins 321 arranged on the inner surface of the socket, such that the pins protrude towards the center of the ejector pin guide 220.

In another embodiment of the socket 320, for use with a cap 113 that does have a grove into which a socket can be inserted, the socket 320 has at least one, but preferably a plurality of friction pins 321 arranged on the surface of said socket 320 facing away from the said ejector pin guide 220.

In a further embodiment, for use with some test tube caps, it is preferable to combine the two previous modes of arranging the at least one friction pin 321.

In FIGS. 3a and 3b an improvement of the socket unit 123 is shown which offers enhanced attachment to a test tube cap 113, this being particularly useful when said cap is damaged or worn, wherein a spring 340 is placed externally to the socket 320, encircling said socket, thereby providing either an internal friction force on a cap, when mounted internally (FIG. 3a) or a compression force (FIG. 3b) towards the center of the socket 320 and thus increasing the friction on said cap 113 exerted by the at least one friction pin 321. The shape of the spring is determined by shape of the socket 320 to which it is external. The spring 340 may be made from any elastic material, but preferentially it is made from an elastomer, such as (but not limited to) rubber or PVC, preferentially in the form of an O-ring, or circlips such as e.g. a metallic spring ring.

In operation, the head unit 120 is moved towards the rack support 110 by the drive system 130. A capping and de-capping gripper 122 engages an opposing cap 113 on an opposing test tube 112 via the socket 320 on the socket unit 123. Disengagement of the cap 113 from the test tube 112 is brought about by the concerted movement of the drive system 130 moving now the head unit 120 away from the rack support 110 and a rotational movement of the actuator unit 240 connected to said capping and de-capping gripper 122 in contact with said cap 113. Caps in contact with a capping and de-capping gripper 122 but not undergoing a rotation by the actuator unit 240 forming part of such a capping and de-capping gripper 122 are not removed from their respective test tubes 112.

To attach a removed cap, the above procedure is reversed. It is stopped when the means for sensing the torque on the ejector pin registers that a certain threshold torque is exceeded. The tube 112 now having a cap has its cap ejected from the socket 320, by moving said tube 112 towards the ejector pin 230 by the drive mechanism 150, whereby the socket unit 123 and ejector pin guide 220 are moved past that end of the ejector pin 230 that is in contact with the cap 113 and said cap is thereby released, freeing the capping and de-capping system 100 to perform a new cycle of capping and de-capping.

The term "comprising" as used in the claims does not exclude other elements or steps. The term "a" or "an" as used in the claims does not exclude a plurality. The controller may fulfill the functions of several means recited in the claims. The reference signs used in the claims shall not be construed as limiting the scope.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A capping and de-cappings system comprising:
   a capping and de-capping socket configured to engage and retain a cap and having an axial through going passage;
   an ejector pin extending through the through going passage of the socket and configured to translate through the through going passage to contact the cap contained in the socket to eject the cap from the socket;
   an actuator coupled to the ejector pin, at an end of the ejector pin opposite to the socket, to induce a rotational movement in the ejector pin, the ejector pin configured to transfer rotational movement to the socket; and
   a drive mechanism configured to translate the ejector pin through the through going passage of the socket to cause the ejector pin to contact the cap retained in the socket to eject the cap from the socket.

2. The capping and de-cappings system as claimed in claim 1 further comprising:
   an ejector pin guide having a through going passage through which the ejector pin translates; and
   a gripper connector detachably connecting the socket to the ejector pin guide to rotate with the ejector pin guide, the ejector pin configured to transfer rotational movement to the socket by transferring rotational movement to the ejector pin guide.

3. The capping and de-cappings system according to claim 2 wherein said capping and de-capping socket further comprises a biasing means external to a detachable mechanical connection between the socket and the ejector pin guide.

4. The capping and de-cappings system according to claim 2 wherein the socket is attachable and detachable to be rotated by the ejector pin guide to which rotational movement of the ejector pin is transferred.

5. The capping and de-cappings system according to claim 1 further comprising a control unit configured to detect a torque on the actuator unit and to halt the rotational movement of the actuator unit if a predetermined threshold value of torque acting on the actuator unit is exceeded.

6. The capping and de-cappings system according to claim 1 wherein the capping and de-capping socket further comprises at least one friction pin oriented to either grab around a cap or to be inserted into a cavity within the cap or both.

7. The capping and de-cappings system according to claim 1 wherein said capping and de-capping socket is made from plastic.

8. The capping and de-cappings system according to claim 7, wherein capping and de-capping socket is injection molded.

9. A method of the capping and de-capping a tube using the capping and de-cappings system of claim 1 comprising:
   moving the socket and tube toward each other to engage a cap on the tube with the socket;
   detaching the cap from the tube by movement of the socket away from the tube with simultaneous rotational movement of the socket caused by the actuator connected to the ejector pin to translate rotary motion to the socket;
   attaching the removed cap by reversing the above steps;
   rejecting the capped tube by translating the ejector pin through the through going passage of the socket to bring the ejector pin in contact with the cap to press the cap and tube from the socket.

10. The method of claim 9 further comprising, during the step of attaching the removed cap, sensing torque on the ejector pin and stopping the rotation when sensed torque exceeds a threshold torque.

* * * * *

UNITED STATES PATENT AND TRADEMARK OFFICE
CERTIFICATE OF CORRECTION

| | | |
|---|---|---|
| PATENT NO. | : 11,332,354 B2 | |
| APPLICATION NO. | : 16/286118 | |
| DATED | : May 17, 2022 | |
| INVENTOR(S) | : Stig Christensen, Lars Hovendahl and Michael Gabs Kaagaard Nielsen | |

It is certified that error appears in the above-identified patent and that said Letters Patent is hereby corrected as shown below:

In the Claims

In Claim 1, Column 7, Line 21, delete "de-cappings system" and insert -- de-capping system --.

In Claim 2, Column 7, Line 36, delete "de-cappings system" and insert -- de-capping system --.

In Claim 3, Column 8, Line 1, delete "de-cappings system" and insert -- de-capping system --.

In Claim 4, Column 8, Line 5, delete "de-cappings system" and insert -- de-capping system --.

In Claim 5, Column 8, Line 9, delete "de-cappings system" and insert -- de-capping system --.

In Claim 6, Column 8, Line 14, delete "de-cappings system" and insert -- de-capping system --.

In Claim 7, Column 8, Line 20, delete "de-cappings system" and insert -- de-capping system --.

In Claim 8, Column 8, Line 23, delete "de-cappings system" and insert -- de-capping system --.

In Claim 9, Column 8, Line 27, delete "de-cappings system" and insert -- de-capping system --.

Signed and Sealed this
Nineteenth Day of July, 2022

Katherine Kelly Vidal
*Director of the United States Patent and Trademark Office*